United States Patent
Amendola

(10) Patent No.: US 7,396,440 B2
(45) Date of Patent: Jul. 8, 2008

(54) LOAD LEVELING AND ELECTROLYSIS SYSTEM

(76) Inventor: Steven Amendola, 22 Lambert Johnson Dr., Ocean, NJ (US) 07712

( * ) Notice: Subject to any disclaimer, the term of this patent is extended or adjusted under 35 U.S.C. 154(b) by 624 days.

(21) Appl. No.: 10/993,267

(22) Filed: Nov. 19, 2004

(65) Prior Publication Data

US 2006/0108214 A1    May 25, 2006

(51) Int. Cl.
*C25B 9/08*    (2006.01)
*C25B 11/03*    (2006.01)
*C25B 1/00*    (2006.01)
*H01M 8/18*    (2006.01)

(52) U.S. Cl. ............... 204/275.1; 204/237; 204/263; 204/DIG. 4; 205/343; 429/12

(58) Field of Classification Search ............ 204/DIG. 7
See application file for complete search history.

(56) References Cited

U.S. PATENT DOCUMENTS

| | | | | |
|---|---|---|---|---|
| 4,042,481 A | * | 8/1977 | Kelly | 204/270 |
| 5,188,712 A | * | 2/1993 | Dilmore et al. | 205/524 |
| 6,716,331 B2 | * | 4/2004 | Chikuma | 205/89 |

* cited by examiner

*Primary Examiner*—Harry D Wilkins, III
(74) *Attorney, Agent, or Firm*—Baker Botts LLP

(57) ABSTRACT

The invention is a device for electrical load-leveling and/or electrolysis. A housing contains pairs of electrodes made from or containing a porous material. The electrodes are filled respectively with an anolyte and a catholyte, which is an ionic couple such as Vanadium +2/+3. A non-permi-selective barrier membrane with openings may be included to substantially separate the electrode pair. The device results in reduced resistive, over-potentials and polarization losses, and may be scaled-up for integration into an electric utility.

20 Claims, 1 Drawing Sheet

LOAD LEVELING AND ELECTROLYSIS SYSTEM

DESCRIPTION

The present invention relates to a system for electrical load leveling for the production of electricity and hydrogen; and a Vanadium-based electrolysis system for the efficient and cost-effective production of hydrogen.

BACKGROUND OF THE INVENTION

Many electrical power sources have problems in matching production to demand. On a small scale, a solar power or wind turbine system that generates power on an intermittent basis, but nevertheless requires power on a broader demand basis. This problem is the same for the entire North American grid system where power producers are constantly trying to balance the power demand with many different integrated sources of power generation. A practical solution to this problem is needed. Several attempts at using various types of batteries (lead-acid, re-dox, etc.) have all been economic if not technical failures. The only current method of energy storage for load leveling is that known as pump-storage, in which energy is stored in the form of pumping water to a higher elevation and holding it in a reservoir. When the energy is required the water is allowed to fall to a lower reservoir while a water turbine extracts the energy. The round-turn efficiency of such a system is about 70%. In other words, for 100 kWh of electric energy put in, 70 kWh is generated. However, the principal problem with pump storage is that it requires large amounts of land that are not readily available at most generation sites.

Another approach to load-leveling which utilities have recently been using is "peaking turbines". These are regular gas turbines connected to electrical generation equipment. The term "peaking" derives from the fact that these turbines can easily and quickly be turned on and off, and the power output regulated, and are used to provide power at times of "peak" demand. While peaking turbines do consume natural gas, which is becoming an expensive fuel, they can be installed for about $600/kW. The electrical switchgear adds another $400/kW. These are key economic marker for the utilities, and any load leveling system most be competitive with that $600-$1,000/kW value.

There is no presently known load leveling system that is competitive. Thus, in the U.S., the entire power production capability is actually double what is needed to meet the average demand, but still not enough to meet certain peaks since these peaks are often more than double the average need. Accordingly, capital equipment sits idle during non-peak periods, and is only used during peak periods, which is often less than a 10% duty-cycle.

Since the presently installed capacity is twice the needed average, the U.S. could meet all of its electrical needs for the next twenty years by installing load-leveling equipment, without the need to build any additional generating capacity. Such a system would be more robust, stable and energy efficient than the current power production grid system and can be accomplished without any infrastructure changes or dislocations. All that would be needed is to install load-levelers at various generation sites, and at points along the grid itself to create the required energy where it is needed, when it is needed, and simultaneously lower the stress on the weaker points of the grid. Some upgrade of the grid may be inevitable, but such a system would go a long way toward minimizing or postponing that inevitability.

While the present invention involves using liquid materials in a so-called re-dox configuration, there is a known conventional Vanadium based re-dox system which is described at www.vrbpower.com. This system uses conventional plate and frame configuration to move ionic liquids through a cell. The cell can either charge the liquids and store power, or it can withdraw power by discharging the liquids. However, these cells require a permi-selective membrane to separate the anolyte from the catholyte and this presents several problems. First, permi-selective membranes are very expensive, and result in the cost of any RedOx system being above $2,000/kW. Second, the membranes are prone to tearing from pressure differences. Third, the membranes do not scale-up well for the large sizes required in power plants, and using many small modules assembled into a large module results in a loss of the economy of scale. Fourth, liquid flow tends to be laminar thus promoting precipitation of material on the membranes, which produces clogs, and prevents proper functioning and raises the resistance of the cell. Thus, both initial costs and maintenance very high.

There are currently no large-scale electrolysis units suitable for integration with an electric utility. While there are some units which utilize membrane electrode assemblies (MEA's), these too are very expensive and unsuitable for scaling-up. Further, in an electrolysis cell there are three key sources of electrical losses, namely resistive, overpotential and polarization. Resistive losses occur when a current passes through any resistance. These losses are generally kept low by keeping resistance low. Overpotential is a phenomenon unique to electrochemical processes. In general when a gas is to be created out of a solution there tends to be an overpotential that is largely dictated by the material of the electrode surface. Platinized platinum has been found to be a material having the lowest overpotential for producing hydrogen from water. However, this material is clearly expensive, and its useful life is probably not sufficiently long enough under the conditions of a large-scale electrolysis. Polarization losses are caused by mass transport phenomena. Essentially ions need to be able to reach the electrodes in the cell. Anything that hinders this movement will create a situation where there are not enough ions present at the electrode to deliver the required current. There is a competition with consumed ions needing to move away from electrode sites while fresh one move in. If this is not met by natural convections, a field is formed that pulls in more ions. This field, however, requires energy and manifests itself as a lower voltage output, caused by polarization losses.

Most electrolysis technology currently employs a standard platinum-carbon coated Nafion MEA (membrane electrode assemblies) which can achieve about 1 watt per square centimeter at acceptable efficiencies of approximately fifty percent (50%). Accordingly, a megawatt system requires 1 million square centimeters or about 100 square meters of a product that costs over $30,000/square meter in large quantities. This amounts to a cost of over $3,000,000 per megawatt just for the membrane. The balance of the plant costs would easily double that amount to over $6,000,000 per megawatt. In a 1,000 megawatt plant the electrolysis unit would cost over $5 billion. Such costs are unacceptable. Further, MEA's have severe problems as they get larger, and therefore, capital costs on a per watt basis would not be expected to drop appreciably as the unit is scaled-up. Specifically, if the membranes are too large and the plates too close to achieve lower resistance, the flow rates required for gas and water become excessive and result in a premature failure of the membrane of which there are several modes including wear, tearing and freezing. Further, the maintenance and reliability of such MEA systems at the required scale are generally not acceptable. It is also well known that the MEA's are very susceptible to poisoning by almost all transition metal ions. This fact necessitates the use of a distilled water source to prevent the rapid degradation of the MEA. Systems that use platinized platinum in order to achieve lower potentials suffer from cost constraints, scalability problems and short life cycles of these fragile materials, all of which make these MEA systems unacceptable for large-scale systems.

SUMMARY OF INVENTION

The present invention which addresses the resistive, overpotential and polarization losses discussed above, provides an economically robust system for load leveling as well as electrolysis units for the production of hydrogen. On a large-scale basis, the novel system is capable of being integrated with an electric utility to achieve effective and cost-efficient load leveling at even spike loads without causing damage to the infrastructure of a utility, thereby helping to stabilize and even prevent a generating plant that has just disconnected from a grid from shutting down. The system of the present invention is modular and can be connected in various series-parallel connections to achieve the desired configuration. The present invention, for the sake of simplicity is referred to the L-Cell for load leveling, or VE electrolyzer for hydrogen production, and in which the use of expensive membranes or MEAs, respectively, are not required. The L-Cell minimizes all causes of resistive (IR) losses by a combination of electrochemistry and mechanical design which keeps resistance very low.

Specifically in connection with the VE electrolyzer, Vanadium compounds, for example, are used in accordance with the present invention to lower the overpotential of the electrolysis cell. The inherently robust design avoids the use of expensive platinum based MEA's. While capital costs vary with size, they are comparatively low in relatively large sizes (about $300 to $500/kilowatt), with a consistently high operating efficiency ~82%, or ~40 kWh of consumed electricity per kilogram of produced hydrogen. Therefore, a cost under 5 cents per kilowatt-hour ($50/megawatt-hr) will yield hydrogen at less than $2/kg. At off-peak utility costs of about 1 cent per kWh hydrogen could be made for only $0.40/kg. This does not take into account the cost benefits of generated oxygen, as well as pollution abatement savings that can be achieved by the system.

In a preferred embodiment, the VE electrolyzer uses the ionic couple of Vanadium +2 /+3 to address the aforementioned overpotential problem. Simply stated, there are no overpotentials when reducing one ion to another ion. This fact enables the present invention to provide an efficient and inexpensive high power system. The Vanadium +2 ion can reduce water to hydrogen. The resulting Vanadium +3 ion is then reduced back to Vanadium +2 ion by the cathode. Other potential ion couples may be used, for example Cr+2/+3, or Ti+2/+3. Vanadium, however is preferred because of its higher efficiency. Further couples for the anode (oxygen producing side) may also be used. Using ion pairs as a catalyst allows the use of electrodes made from common materials with very high surface areas, and simple configurations to create a low-cost, high power and efficient electrolyzer. Rules for choosing a suitable ionic couple for the electrolysis system include the following:

(a) The reducing couple has to be sufficiently reducing to reduce water to hydrogen;

(b) The net voltage of the pair needs to be as close (but not less than) the theoretical voltage required to split water directly, i.e., 1.229 V.

(c) Both pairs have to be from the same element or one anionic element and one cationic element. So V+2/+3 with V+4/+5; or V+2/+3 with Br (liquid)/Br—. These includes all suitable compounds and complexes containing said elements; and (d) All reactions must be freely reversible. (Charge-discharge cycle).

If it is only desired to load level, and not make any hydrogen, then only rules 2.c. and 2.d. above apply. Acceptable Electrolysis pairs include:

(catholyte) and (anolyte)
V+2/V+3 and V+4/V+5
Cr+2/Cr+3 and Cr+3/Cr+4, 5, 6
Ti+2/+3 and Ti+3/+4
P+1/P+3 and P+3/P+5 (in base only)
U+3/U+4 and U+4/U+6
In+1/In+2 and In+2/In+3. The first ion is the hydrogen reducing ion.

The above pairs can also have many different complexing agents or counter ions and still be useful in the present invention. (i.e. Ti+4 may be in the form of [TiC16]2— or P may be H2PO2—, etc.)

Further it is possible to expand the choice of materials, a mixed liquid solid system may be used. Accordingly, additional pairs become possible such as:

Zn (0)(metal)/Zn+2 and Br (liquid)/Br—
Zn (0)(metal)/Zn+2 and Cl (gas)/Cl—
Fe (0)(metal)/Fe+2 and Fe+2/Fe+3

In the above listed systems, if the anode couple such as (Fe+3) is not of sufficient strenth to generate oxygen from water, then it may be recycled through the cathode. Any resulting mixing is not a problem. Thus the Fe+2/+3 couple is 0.77 V, but it gets cycled once so no oxygen is produced; however, 0.77×2e- is the same energy as 1.54V and 1.23/1.54~80%. Such a system, however, consumes acid but in the case where the anolyte is used in a sulfur screubber, the acid is created.

In the context of load leveling (L-Cell), the numbers of pairs suitable are more numerous than these listed above; however, all of the listed pairs do meet the requirements for load leveling and may indeed be used. In addition any pair may be used that meets the requirement of rules 2 c and d and thus making hundreds of possible combinations.

It is also possible to use some very inexpensive materials in the load-leveling context such as iron and manganese:

Fe+2/+3 and Fe+3/+6
Fe (0)(metal)/Fe2+ and Fe2+/Fe3+
Fe (0)(metal)/Fe2+ and Fe3+/Fe6+
Mn (0)(metal)+2, +3/Mn+3, 4, 5, 6, 7

These two elements give over 20+ possible systems. The anolytes could also be changed for Cl, or Br, which would result in another 30+ or so combinations.

By making changes, different per cell voltage may be created. In general all the transition elements where the outer electron is a d or p shell electron (Group 3 through 17 inclusive) all meet the criteria for a load leveling pair. In general the alkali, (Group 1) alkaline (Group 2), Lanthanides (Z=57-71) and the Noble gases are not suitable. Actinides elements Z=92 to 95 are generally suitable if the radioactivity is not a problem. Thus it can be seen that hundreds or even thousands of combinations of pairs are suitable for use in the present invention.

The L-Cell operates at over 80% efficiency. Its novel cell design addresses all three major problems of a cell, namely, overpotential, polarization and IR losses. An important element of the L-Cell design is the use of electrodes made from suitable porous materials such as woven plastic closths or carbon felts, formed, for example in the shape of a tube. Alternatively, a suitable conductive material may be incorporated into a tube made from a porous metal, again, for example, a carbon felt. The L-Cell design is both inexpensive and robust and can be built for about $300,000 to $500,000/ megawatt. It is also versatile enough to contribute to the reduction of sulfur emissions at a power plant at a great savings compared to lime scrubbers and can reduce the costs of NOx scrubbing.

DETAIL DISCUSSION OF THE INVENTION

The present invention provides a truly scalable load leveler and electrolyzer at less than $500,000/megawatt. Each chamber of the L-Cell is preferably designed as a large structure in order to allow for large current loads, as well as accompanying required high water and gas flows to match the high power inputs.

The materials used in the construction of the L-Cell containers, tanks are relatively inexpensive, such as PVC or PE or PP or many other plastics suitable for use with the chosen electrolyte, e.g., $H_2SO_4$. The electrodes can be made of many suitable porous materials having a conductive material either inside of an electrode or formed as at least a part of the electrode. Said material must not deteriorate in the electrolyte, yet it must efficiently conduct electricity. Carbon and metal materials are generally preferred. Each L-Cell uses about 1.5 volts per cell (depending on the chosen ion couples) to charge; and each group of cells may contain as many cells as desired. The banks of cells may be connected as needed in series and/or parallel to accommodate desired voltages and multiphase electrical systems.

Figure 1:
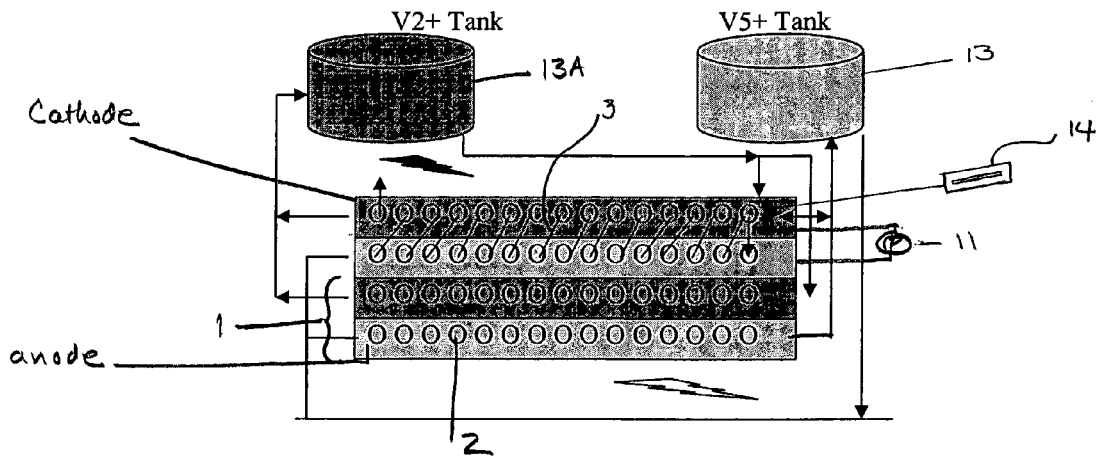
FIG. 1 is a top view of an embodiment of the present.
Figure 2:
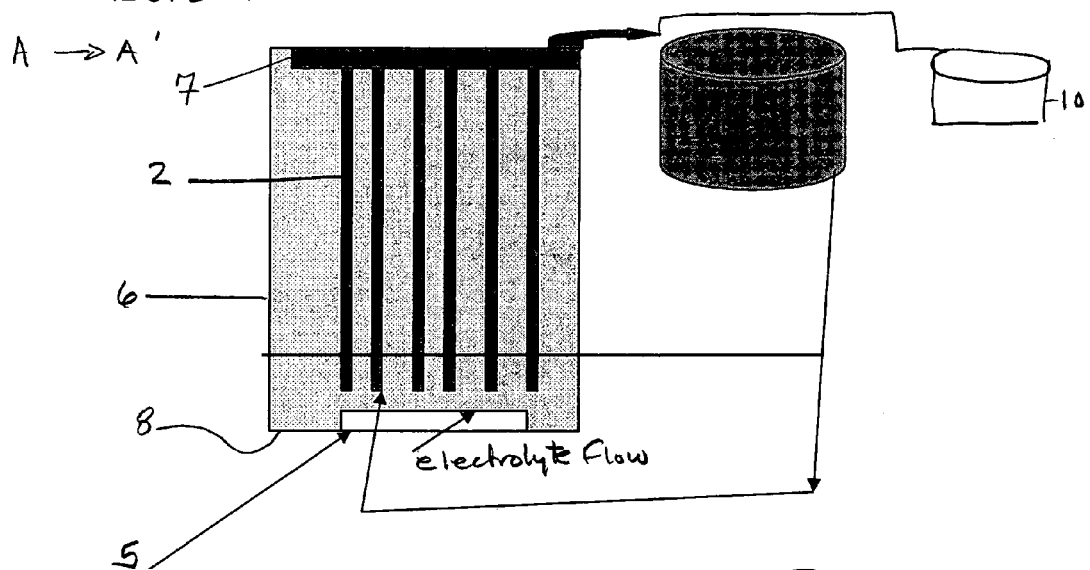
FIG. 2 is a cross-sectional side view along line A-A' of one half a cell in FIG. 1.

In one embodiment of the L-Cell (see FIGS. 1 and 2), each group of cells (stage) consists simply of two rectangular prismatic chambers 1. Each chamber has a long series of conductive pipes (tubes) 2 standing upright, also referred to as porous electrodes. The electrodes function to transfer electrons from one part of the cell to the other side through an external electrical circuit. The electrodes interface the ions in solution with the electrons needed to create an external current. The electrodes may consist of two major components, an outer shell and an inner filling. The outer shell may be made of any porous material that allows passage of liquid. The material may or may not be conductive. The inner portion may either be hollow or may contain a conductive material to enhance the needed reactions. The conductive materials tend to work better if they have a higher intrinsic surface area. Thus materials such as granules, powders, felts, wools, wires, beads, foam metal, sintered powdered metals are all acceptable. An important criterion that the material must meet is its ability to withstand the environment of the chosen electrolyte, sulfuric acid for instance. Acceptable materials include carbon felts and graphite felts, other forms of carbon, various stainless steel, alloys, 316, Carpenter A-20, nickel, titanium, etc., plastics (PE, PP, PVC etc.) which may be made porous by being woven in a cloth as is commonly found in industry (PP filter cloth) or by having many microholes, etc. Various metals may be sintered to form porous structures such as are used to make spargers, or woven into metal cloths. Any suitable combination of conductive or non-conductive tube design with a hollow or conductive interior is acceptable for use in the present invention. The conductive portion of the electrode is then suitably connected to the other electrodes or outside connectors as required.

The pipes in one chamber are electrically connected 3 to the pipes in the other chamber in a series connection that allows the use of higher voltages. The pipes on one side are all anodes, and the pipes on the other side are all cathodes. Each electrode pipe is provided with a large volume of a high surface area conducting material 4 which enhances the electron transfer. At least one opening 5 or other passage that starts substantially at the bottom of a wall member 6 separating the two chambers is/are provided. Preferably, the top of the 6 barrier member touches the bottom of a chamber 7 that collects the outflow of the electrode. The bottom of the barrier 8 contacts the bottom of the container 9, except where the opening(s) are formed. The size of the opening 5 depends on the size of the L-Cell. In one example, the size of the opening is about 2-10 centimeters and allow for passage of ionic current and mass transport between the anode and cathode compartments. The bottom portion of the conducting electrode 2 starts a few centimeters above the opening(s) in the barrier member. In this way reduced and oxidized species produced will be inhibited from mixing, and instead tend to stay in separate manifolds. The short path length i.e., the distance between the anode and cathode insures low resistance. The electrolyte needs to be conductive, and this can be accomplished by the addition of acids, bases or salts that do not need to be replaced during normal operation. Inexpensive, readily available materials, such as sulfuric acid, provide a very low resistance medium for the L-Cells.

As discussed above, overpotentials can consume a significant portion of the energy required in a cell and lower its the efficiency significantly. Specifically, the theoretical voltage required for water electrolysis is 1.229 volts. In current systems, the use of a steel electrode with an 0.5 volt overpotential increases the needed minimum voltage to 1.73 volts. Accordingly, the best efficiency is (1.23/1.73=~71%). Such a cell would require over 2 volts in order to overcome IR and overpotential losses, and its efficiency is only about 50%. To avoid this, electrodes are coated with materials that lower this overpotential. The best material for accomplishing this is a high surface area type of platinum. When coated over a surface (often platinum itself) the electrode is referred to as "platinized". While platinum or platinized electrodes may be used in the L Cell, platinum is scarce and expensive. Therefore, finding another way to reduce this overpotential loss is needed. The L-Cell meets this need since the cathode reduces Vanadium ions in solution rather than reducing protons in solution directly to gas. The mechanism for producing gas from solution relates to the attraction of the material for hydrogen. It is the production of gas that produces overpotentials. However, the reduction of an ion from one charge to another in solution has no overpotential since it only involves the transfer of electrons and not gas formation. For this reason most ionic reduction can be carried out at near 100% efficiency. The reduced ion causes water to be reduced to hydrogen gas when desired. Heat and/or catalysts may be used if desired. This can be done in a separate holding tank or in the electrolyte chamber itself.

The equations for the reduction of Vanadium 3+ and hydrogen generation are as follows:

$$2V^{3+} + 2e^- \rightarrow 2V^{2+} \quad \text{cathode } E = -0.255\,V \quad (1)$$
$$2V^{2+} + 2H^+ \rightarrow 2V^{3+} + H_2 \quad \text{in solution (when desired)} \quad (2)$$

Figure 3:
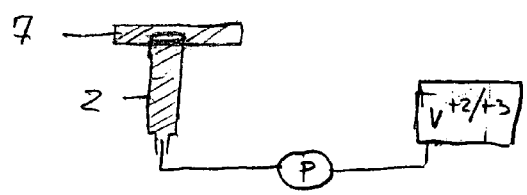
FIG. 3 is a view of an individual electrode (cathode) shown in FIGS. 1 and 2.
Figure 4:
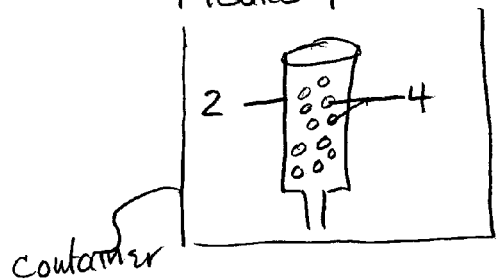
FIG. 4 is an interior view of the electrode shown in FIG. 3.

In the charging mode the pipe 2 (cathode as shown in FIG. 3) acts as an electrical conductor, and is filled with a solution of Vanadium 3+ from a holding tank, which is then reduced to the 2+ ionic state. It is not necessary that all of the Vanadium 3+ be reduced. Above the electrode, chamber 7 acts to withdraw the catholyte which is pumped to a holding tank 10. Alternatively, the liquid may be withdrawn directly from the electrode as shown in FIG. 5. The reaction is completed in a separate catalyst chamber which may be fed from tank 10. This tank may also serve as the reservoir for the Vanadium 3+ that is pumped to the cathode in the discharge mode. Accordingly, in the L-Cell Vanadium 3+ is prevented from crossing over to the anode compartment, all without the need of a membrane. If desired, however, a barrier may be used, but it can be an inexpensive barrier since any material, even a simple cellulose or plastic may be used. Nevertheless, it is the absence of any membrane that is a desirable goal in order to minimize IR losses. Likewise on the anode side, an ionic material that can be oxidized is pumped through the pipe electrodes 2 and separately oxidized. In this case a Vanadium 4+/5+ couple would be suitable. Vanadium 4+ and 5+ are oxo species in aqueous systems and will be represented as such in the following equations:

$$2VO^{2+} + 2H_2O \rightarrow 2VO_2^+ + 4H^+ + 2e^- \quad \text{anode } E = -1.0\,V \quad (3)$$
$$2VO_2^+ + 2H^+ \rightarrow 2VO^{2+} + H_2O + \tfrac{1}{2}O_2 \quad \text{in solution (when desired)} \quad (4)$$

The protons produced in equation 3 naturally migrate toward the cathode to achieve a charge balance and provide protons for equation 2. There is thus a net mass flow of sulfuric acide (in this case) from the amode to the cathode during the charging process. Clearly during the discharge process this mass flow is reversed, so that in a full charge-discharge cycle there is no theoretical net mass transfer. A pump 11, which may be part of the design of the L-Cell, (but would not be suitable for other prior art systems) assists the process and reduces the polarization effects as discussed below.

The net sum of equations 1 through 4 is the electrolysis of water. Note that the reactions that require the electrical input (1 and 3) have a net energy requirement of 1.255 volts. This compares very favorably to the theoretical voltage requirement for the direct electrolysis of water of 1.229 volts. Thus this system has a potential of achieving (1.229/1.255)~97.9% efficiency.

The system of the present invention reduces the voltage to generate the gases with a loss of less than 30 millivolts, and without the use of expensive platinum-based electrodes or expensive membranes. Additionally the open architecture of the L-Cell allows for very low IR losses, far less than occurs when permi-selective membranes are used. In order to create a sufficient current flow through any electrolysis cell the voltage is typically raised to overcome IR losses, and create sufficient currents to produce reasonable amounts of hydrogen from a given cell, which also reduces capital requirements. With very low IR losses, and low polarization losses (explained below) the cell is run efficiently even at 1.5 volts, with the net efficiency of the system being about 82%. This surpasses efficiency of the most expensive cells, while being far more cost effective and at the same time suitable for large-scale use.

The holding tanks for the Vanadium solutions can be made of inexpensive plastics. If hydrogen or oxygen is desired at a given pressure the liquid may be pumped into a pressure vessel, and reaction 2 or 4 will self pressurize the vessel. Other components include pumps and a catalyst column (not shown).

A particularly unique feature of the present invention is realized by pumping the Vanadium solution in an upward direction through the electrodes so that a concentration gradient of Vanadium ions is maintained without a membrane. At the lowest part of the cell, i.e., where opening(s) 5 are located, it is desirable to have no Vanadium ions, but instead just sulfuric acid. This allows the protons to do all of the ionic conduction. If a Vanadium 4+ ion does cross over into the cathode compartment, no serious problem occurs, since it only takes 1 extra electron to create a V2+ ion. However if too many V4+ were to cross over this could create columbic inefficiency; but since such an inefficiency would be less than the IR increase that would be created by the insertion of a membrane, it is still acceptable and to be preferred over that of the larger loss caused by a membrane. Nevertheless, protons have a very high mobility in water (the highest by far of any species), and therefore the natural current will be composed mostly of protons as designed.

The L-Cell provides another way to improve transport that is not available to other cells, namely by using a pump 11, as discussed above to aid the transport of electrolyte from the anode to the cathode chamber. Since each stage has many electrodes, but only one anode compartment, and one cathode compartment, the transfer may be accomplished using one small pump. The energy required for the pump is far less than the energy required to raise the voltage enough to overcome polarization.

Another mechanism that lowers polarization losses is the pumping action of the pumps that pump the anoylte and the catholyte through their respective electrodes. The flow in the electrodes will tend to be somewhat turbulet and the turbulence will lessen any precpitation on the electrodes. Not only is electrolyte flow (in the electrode) helpful in preventing or lessening precipitation, the turbulent flow (in the electrodes) also reduces polarization losses at the electrodes by enhancing mass transfer. Finlly, this design also allows the creation of very high surface area structures in three dimensions rather than the "two" dimensions.

Another problem with the use of membranes as in the prior act, is that settling may clog the membranes, since membranes slow the passage of the protons, and thus locally, the pH can be higher (or lower) than it is in the bulk. Since Vanadium (and many other transition elements) are susceptible to fomation of hetero-poly-oxo anions (or any insolubles) and could cause formation of solids; this potential problem is removed by the absence of any membranes.

Furthermore the electrolyte may be cooled without the weak link of a membrane. In the present invention, one can also separately cool either the anolyte, catholyte or the electrolyte. The mass transfer of the electrolyte (which is almost pure sulfuric acid and water) can be assisted with an external pump to further lower polarization losses. This can not be done with a membrane system. It is also possible to pump the electrolyte through a heat exchanger.

Anytime large currents are applied there will be polarization losses. These losses increase with power input and are undesirable in current electrolyzers when scaled-up. Previously known systems have no way of mitigating this effect. However, the L-Cell is designed to use a pump to get protons from the anode compartment to the cathode compartment during charging. The liquid level in the anolyte is maintained during the discharge cycle when the flow goes the other way. The level of pumping is determined by power input. Electrical measurements of the anolyte and catholyte (pH, gradient voltage, ORP, conductivity, etc.) can be continuously monitored between the two sides of the cell with standard probes. These probes can provide input into a small controller that would regulate pump speed and electrolyte input. Other methods of control can also include varing the relative pressures in the electrode versus the electrolyte, by regulating the pumping pressures and/or changing the ionic strength of the electroyte versus the anode and catholyte to create and osmotic pressure differential. Such methods could further enhance the ability of proton transfer over other ions carrying the current load.

Another benefit of using the pump mechanism 11 is that it can be used as a method of preventing Vanadium ion crossover. An ion exchange column 12 filled with inexpensive commercially available ion exchange beads, such as the type used in water softening, is used to collect any Vanadium ions in the stream. Thus this inexpensive column 12 accomplishes what an expensive resin membrane might otherwise do, but at a far lower cost, and with no increase in IR losses. A backwash (not shown) may be used to recover the Vanadium ions and generate the resin at the same time. The Vanadium ions are then returned to the corresponding holding tank 13 and 13A. Two such columns can insure constant operation, if desired, with one column absorbing while the other is being regenerated.

The L-Cell of the present invention also solves the problem of the removal of sulfur dioxide from flue gases. It is anticipated that the L Cell will be used at large power plants, many of which will have sulfur-removing scrubbers in place, i.e., normally lime which must be purchased, transported, reacted to calcium sulfite or sulfate, and disposed of. While a small amount of any calcium sulfate can be used in the gypsum wallboard market, this type of scrubbing system is expensive, and large amounts of lime-based scrubber material must be disposed of in suitable landfills.

In accordance with the present invention, flue gases containing sulfur dioxide may be reacted directly with the charged solution from tank 13. The sulfur dioxide reacts rapidly with the Vanadium 5+ to generate sulfuric acid as shown in the equation below:

$$2VO_2^+ + 2H^+ + SO_2 \rightarrow 2 V^{2+} + H_2SO_4 \qquad (5)$$

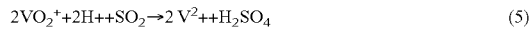

In this manner high quality sulfuric acid can be drawn-off from the system and sold.

The Vanadium solution comes from an anolyte reservoir tank 13, to which it can be returned. Any fly ash or other particulate matter may be filtered out from the solution returning from the scrubber before it goes back to the anolyte storage tank. Any Vanadium that is not used for scrubbing can still be used for electrical or oxygen production. It should be noted that this may also be a source of Vanadium, since it is well known that Vanadium is a common component of many types of fly ash. Since the Vanadium is dissolved in the scrubbing operation it may be added to the process loop. Any excess Vanadium that builds up can also be extracted from the ion exchange resin column and sold rather than be returned to the anolyte tank.

The above-discussed flexibility enables the present invention to be capable of making hydrogen, oxygen, electricity and sulfuric acid with the energy input from an electrical source. Since the Vanadium can be stored as a liquid, it may be used for scrubbing sulfur emissions when a power plant is operating, but where an electrolysis unit is not. Further, the anolyte may be shipped to other plants, for sulfur dioxide scrubbing, and the reduced Vanadium sent back for reuse in the present invention. This is far more cost-effective compared with the costs associated with the use of lime and the attendant problems, including its disposal.

Sulfuric acid is the single largest commodity chemical market available, and in the present invention it is made from only water, sulfur dioxide and the electricity used to make hydrogen. In order words, the sulfuric acid is made essentially for free from materials available on-site. Further, the Vanadium solution may be used in conventional scrubbers. Another advantage is that unlike lime, the acid solution will not react with carbon dioxide as lime does which increase the costs associated with lime.

Finally, it should be noted that $NO_2$ in an acidic medium has a potential over 1.0 volts. Therefore, the use of the V 4+ material can be oxidized by contact with NOx to the V5+ in accordance with the following reaction:

$$4 VO^{2+} + 2 NO_2 + 2H_2O \rightarrow 4 VO_2^+ + 4H^+ + \tfrac{1}{2} N_2 \qquad (6)$$

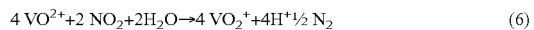

Thus any NOx helps regenerate V5+ for sulfur dioxide removal.

As can be seen from the above, a number of significant advantages over the current state of load leveling and electrolysis technology are realized as a result of the present invention:

1) Acceptable capital cost for large-scale plants achieved;
2) Maximum practical efficiency achieved at lowest operating cost;
3) Hydrogen production at about 40 kWh per kilogram;
4) Extremely low maintenance costs or plant problems;
5) Easily incorporated into a large-scale utility or grid system;
6) Accepts upsets and large surges in power;
7) No membranes to wear out or rip or be puncture by large electricity spikes;
8) Instant-on, ready to go at all times;
9) First practical system for load leveling, and capable of being scaled to giga watts;
10) Only electrolysis system that can also remove sulfur dioxide and NOx from flue gas for almost no cost;
11) Intrinsically designed to handle extremely high production rates of gases in a small volume;
12) Electrodes are robust and permanent. No replacement of expensive parts;
13) Extremely high reliability. Meant for 100% duty cycle, minimal downtime;
14) Uses inexpensive Vanadium compounds (~$3/lb) or iron ($0.20/lb) or Man ($0.35/lb) instead of scarce platinum based (>$700/tr. oz.) electrodes.
15) No expensive ion membranes, or MEA's to pay for or maintain;
16) No membranes that can be poisoned;
17) Does not require the use of expensive distilled or DI water.

These advantages represent technological advances, or major capital, operational or maintenance cost saving, all due to the superior technology of the L-Cell.

I claim:

1. A device for electrical load leveling and/or electrolysis comprising:
   a housing;
   at least one pair of electrodes located within the housing; and
   a non-permiselective barrier member substantially separating the pair of electrodes, the barrier being formed with an opening to allow ionic current and mass transfer of a suitable electrolyte to occur,
   wherein the electrodes are made of porous material and having interiors that are fed respectively-with an anolyte and a catholyte selected from a suitable ionic couple by flowing the anolyte and catholyte into the respective interiors so that substantial mixing of the anolyte and catholyte is prevented by having the anolyte and catholyte flow away from the opening in the barrier.

2. The device according to claim 1, wherein the electrodes are substantially tubular and formed from a suitably porous conductive material.

3. The device according to claim 1, wherein the electrodes are substantially tubular and contain a suitably conductive material.

4. The device according to claim 2, wherein the conductive material is selected from the group consisting of granules, powders, felts, wools, wires, beads, foam metal, and sintered metal and other high surface area materials capable of resisting deterioration by the electrolyte.

5. The device according to claim 1, further comprising a chamber for collection of the anolyte and a chamber for the collection of the catholyte from the respective electrodes.

6. The device according to claim 1 wherein the opening is located at a bottom end portion of the barrier.

7. The device according to claim 1, wherein the barrier is formed from a porous non-permiselective material.

8. The device according to claim 1 wherein a top portion of the barrier member contacts a collection chamber.

9. The device according to claim 1, comprising a plurality of electrode pairs and wherein the barrier members are formed with a plurality of openings.

10. The device according to claim 1 wherein the container, barrier member and electrode pairs are made from a material that will not deteriorate in the presence of the electrolyte.

11. The device according to claim 1, further comprising at least one pump mechanism.

12. The device according claim 1 wherein the ionic couple is chosen from the group consisting of the same element, and one cationic element and one cationic element, and wherein all charging and discharging reactions are reversible.

13. The device according to claim 12, wherein the ionic couple is Iron +2/+3 for the catholyte and Iron +3/+6 for the anolyte.

14. The device according to claim 1, wherein the ionic couple is capable of reducing water to hydrogen.

15. The device according to claim 12 wherein the ionic couple has a net voltage of not less than 1.229V.

16. The device according to claim 12, wherein the ionic couple is Vanadium +2/+3 for the catholyte and Vanadium +4/+5 for the anolyte.

17. The device according to claim 12, wherein the couple is Mn+2/+3 for the catholyte and any combination of Mn +4/+5/+7 for the anolyte.

18. The device according to claim 12, wherein the couple is Zn+0/+2 for the catholyte and Br0/Br- for the anolyte.

19. The device according to claim 12, wherein the ionic couple is Fe(0)+2 and Br(0)/Br.

20. The device according to claim 12, wherein the ionic couple is any suitable pair selected from Group 3 to Group 17 elements.

* * * * *